United States Patent
Suh

(10) Patent No.: US 9,452,666 B1
(45) Date of Patent: Sep. 27, 2016

(54) CUSHIONING ASSEMBLY

(71) Applicant: John Suh, Los Angeles, CA (US)

(72) Inventor: John Suh, Los Angeles, CA (US)

(*) Notice: Subject to any disclaimer, the term of this patent is extended or adjusted under 35 U.S.C. 154(b) by 0 days.

(21) Appl. No.: 14/656,292

(22) Filed: Mar. 12, 2015

(51) Int. Cl.
*B60J 11/02* (2006.01)
*B60R 16/023* (2006.01)
*B60R 21/00* (2006.01)
*B60R 21/215* (2011.01)

(52) U.S. Cl.
CPC ........... *B60J 11/025* (2013.01); *B60R 16/023* (2013.01); *B60R 2021/0006* (2013.01); *B60R 2021/21537* (2013.01)

(58) Field of Classification Search
CPC ............... B60R 19/42; B60R 19/205; B60R 2021/21537; B60J 11/06; B62D 21/157
See application file for complete search history.

(56) References Cited

U.S. PATENT DOCUMENTS

| | | | | |
|---|---|---|---|---|
| 3,563,594 A * | 2/1971 | London | | B60J 11/025 105/324 |
| 4,530,519 A * | 7/1985 | Marshall | | B60J 11/025 280/770 |
| D308,848 S | 6/1990 | Genicoff | | |
| 5,129,695 A | 7/1992 | Norman, II | | |
| 5,732,785 A * | 3/1998 | Ran | | B60R 19/205 180/271 |
| 5,915,724 A * | 6/1999 | Daris | | B60R 21/215 280/728.3 |
| 6,209,909 B1 * | 4/2001 | Breed | | B60R 21/01538 280/729 |
| 6,457,755 B1 | 10/2002 | Nieto | | |
| 6,755,453 B2 * | 6/2004 | Kellas | | B60R 19/42 188/377 |
| 6,883,631 B2 * | 4/2005 | Hu | | B60R 19/205 180/274 |
| 6,918,459 B2 * | 7/2005 | Breed | | B60N 2/002 180/282 |
| 7,232,001 B2 * | 6/2007 | Hakki | | B60R 19/205 180/271 |
| 7,461,877 B2 * | 12/2008 | Bailey | | B60R 19/205 293/142 |
| 7,640,698 B2 | 1/2010 | Graham | | |
| 7,806,221 B2 * | 10/2010 | Mishra | | B60R 19/205 180/271 |
| 7,854,447 B2 * | 12/2010 | Kanno | | B60R 21/215 280/728.2 |
| 7,967,098 B2 | 6/2011 | Choi | | |
| 8,136,835 B2 * | 3/2012 | Rajasingham | | B60N 2/4235 280/730.2 |
| 2003/0062732 A1 | 4/2003 | Molina | | |
| 2004/0049331 A1 * | 3/2004 | Schneider | | B60R 19/205 701/45 |
| 2005/0248184 A1 * | 11/2005 | Piffaretti | | B60J 5/04 296/187.03 |
| 2007/0057491 A1 | 3/2007 | Bayley | | |
| 2007/0063492 A1 | 3/2007 | Igawa | | |
| 2009/0315303 A1 * | 12/2009 | Ettinger | | B60R 21/215 280/728.2 |
| 2014/0318881 A1 * | 10/2014 | Sugimoto | | B60R 21/237 180/274 |
| 2014/0367983 A1 * | 12/2014 | Capitina | | B60R 19/42 293/128 |
| 2015/0343980 A1 * | 12/2015 | Hotta | | B60R 21/207 280/728.3 |

* cited by examiner

*Primary Examiner* — Emma K Frick

(57) ABSTRACT

A cushioning assembly includes a vehicle that has at least two doors. A first shield apparatus and a second shield apparatus are each coupled to the vehicle. The first shield apparatus and the second shield apparatus are positionable to cover the doors. The first shield apparatus and the second shield apparatus shield the doors from impact damage. A pump is coupled to the vehicle. The pump is in fluid communication with the first shield apparatus and the second shield apparatus. The pump selectively inflates and deflates the first shield apparatus and the second shield apparatus. A control is provided for selectively actuating and de-actuating the pump.

10 Claims, 4 Drawing Sheets

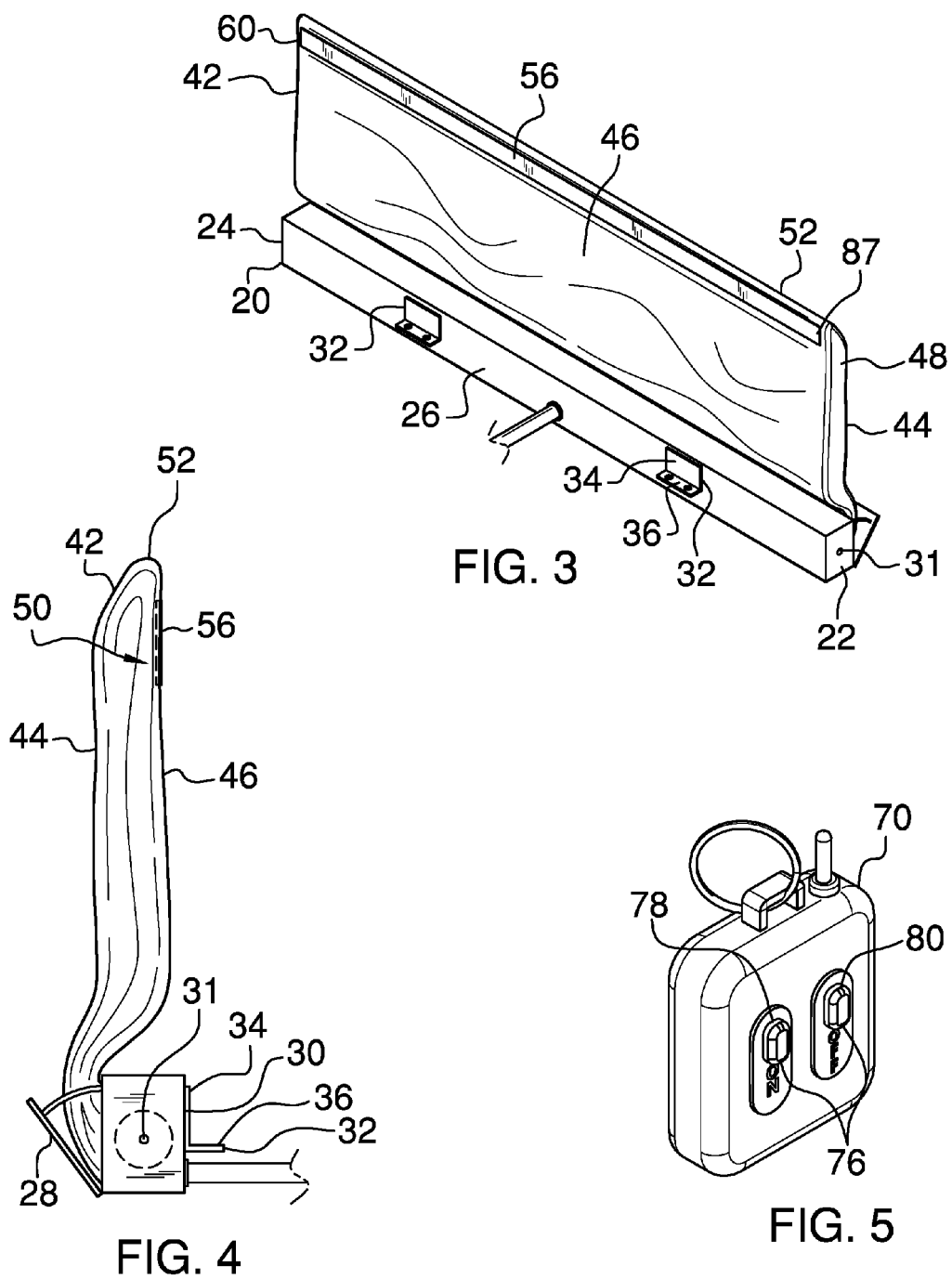

CUSHIONING ASSEMBLY

BACKGROUND OF THE DISCLOSURE

Field of the Disclosure

The disclosure relates to cushioning devices and more particularly pertains to a new cushioning device for protecting vehicle doors from impact damage.

SUMMARY OF THE DISCLOSURE

An embodiment of the disclosure meets the needs presented above by generally comprising a vehicle that has at least two doors. A first shield apparatus and a second shield apparatus are each coupled to the vehicle. The first shield apparatus and the second shield apparatus are positionable to cover the doors. The first shield apparatus and the second shield apparatus shield the doors from impact damage. A pump is coupled to the vehicle. The pump is in fluid communication with the first shield apparatus and the second shield apparatus. The pump selectively inflates and deflates the first shield apparatus and the second shield apparatus. A control is provided for selectively actuating and de-actuating the pump.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a back perspective view of an embodiment of the disclosure.

FIG. 4 is a right side view of an embodiment of the disclosure.

FIG. 5 is a perspective view of remote control of an embodiment of the disclosure.

DESCRIPTION OF THE PREFERRED EMBODIMENT

Figure 1:
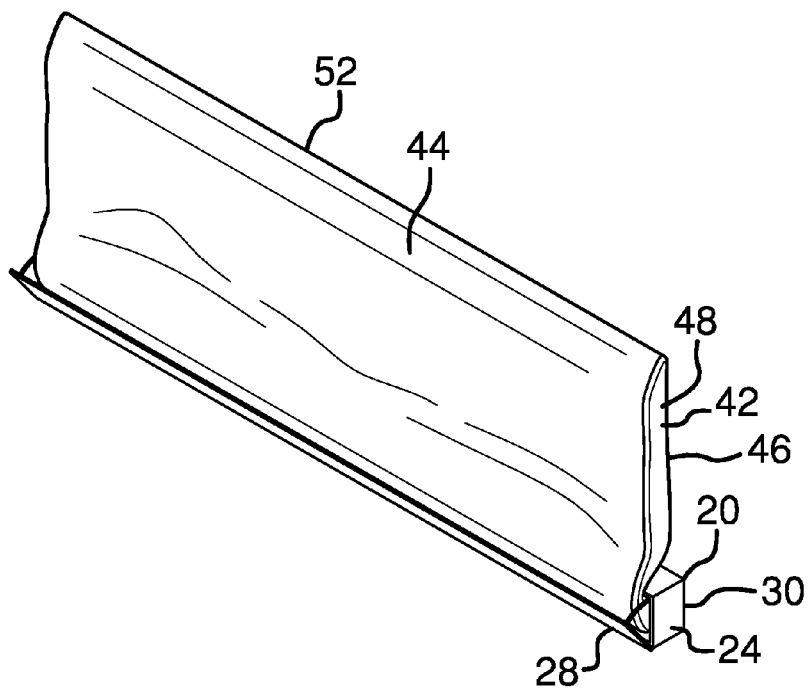
FIG. 1 is a perspective view of a cushioning assembly according to an embodiment of the disclosure.
Figure 2:
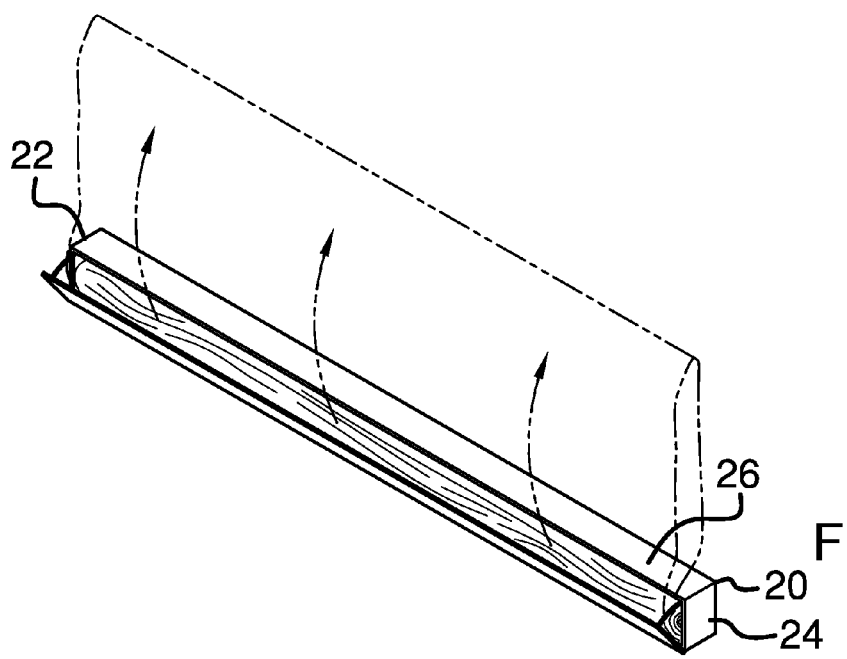
FIG. 2 is a front perspective view of an embodiment of the disclosure.
Figure 6:
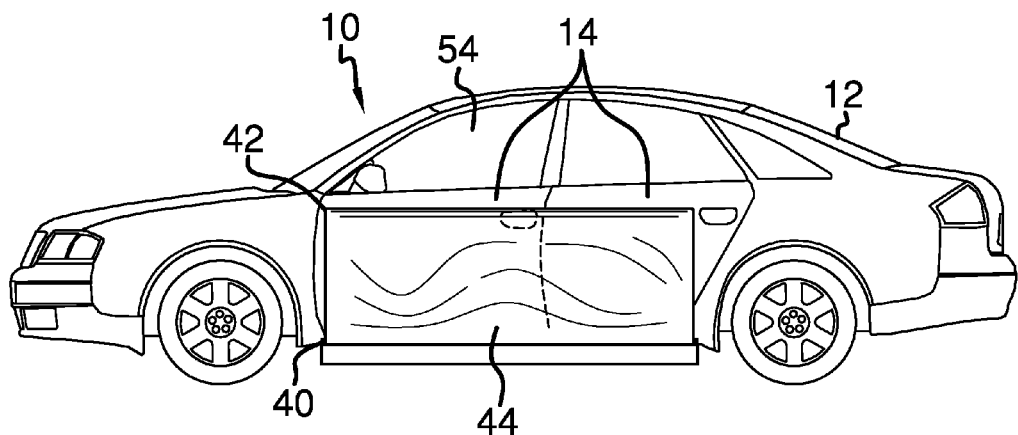
FIG. 6 is an in-use view of an embodiment of the disclosure.
Figure 7:
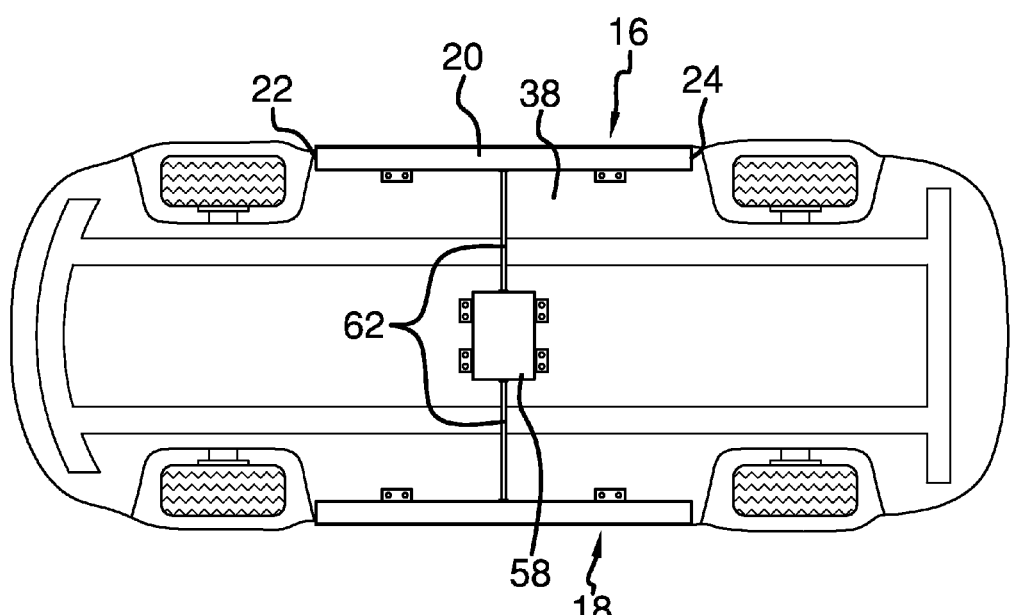
FIG. 7 is a bottom view of an embodiment of the disclosure.
Figure 8:
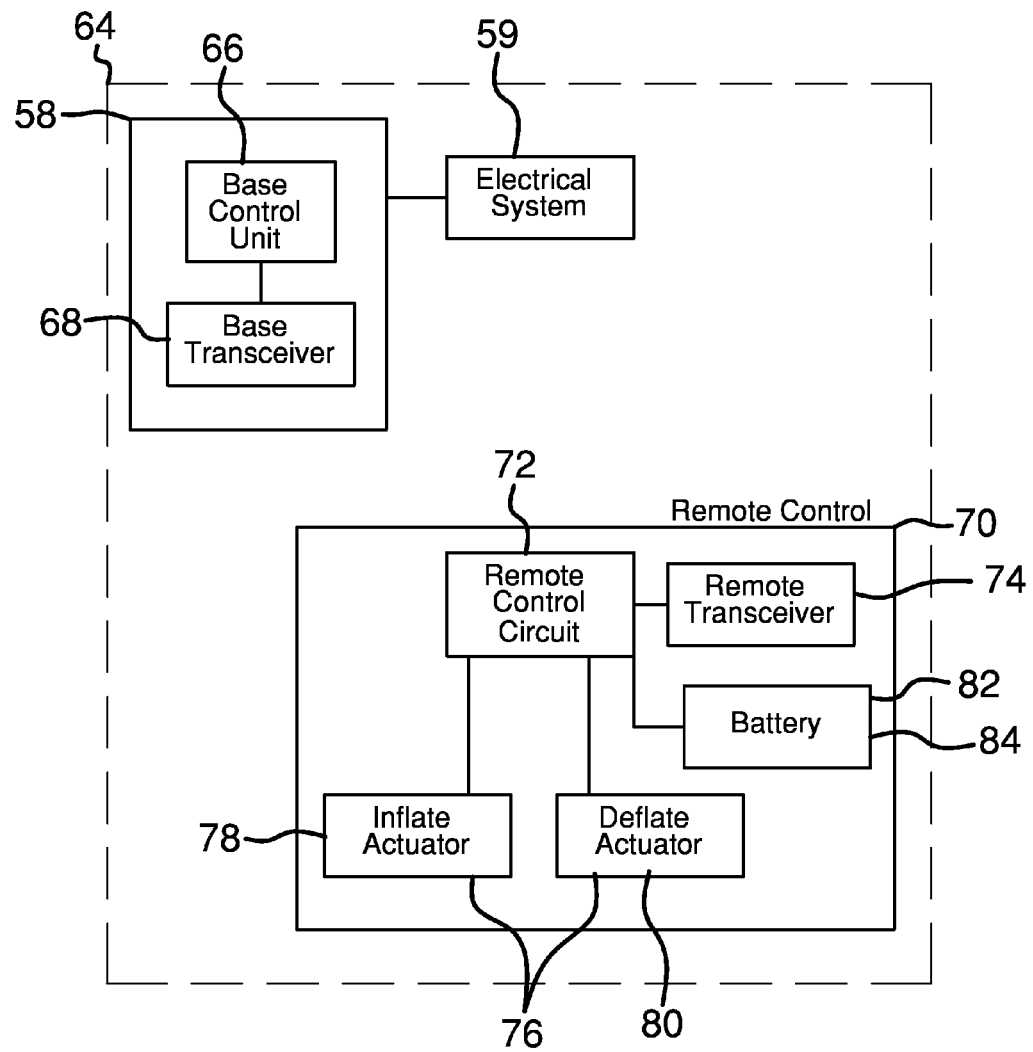
FIG. 8 is a schematic view of an embodiment of the disclosure.

With reference now to the drawings, and in particular to FIGS. 1 through 8 thereof, a new cushioning device embodying the principles and concepts of an embodiment of the disclosure and generally designated by the reference numeral 10 will be described.

As best illustrated in FIGS. 1 through 8, the cushioning assembly 10 generally comprises a vehicle 12 that has at least two doors 14. A first shield apparatus 16 and a second shield apparatus 18 are each coupled to the vehicle 12. The first shield apparatus 16 and the second shield apparatus 18 are positionable to cover the doors 14. Additionally, the first shield apparatus 16 and the second shield apparatus 18 shield the doors 14 from impact damage.

Each of the first shield apparatus 16 and the second shield apparatus 18 comprise a housing 20 that has a first end 22, a second end 24 and a perimeter wall 26 extending therebetween. The perimeter wall 26 has a front side 28 and a back side 30. The front side 28 is hingedly coupled to the perimeter wall 26 to access an interior of the housing 20. The housing 20 is coupled to the vehicle 12. A spindle 31 is provided. The spindle 31 is rotatably coupled between the first 22 and second 24 ends of the housing 20. The spindle 31 is positioned within the housing 20.

A pair of brackets 32 is provided. Each of the brackets 32 has a first section 34 forming an angle with a second section 36. The first section 34 is coupled to the back side 30 of the housing 20 such that the second section 36 extends away from the back side 30. Each of the brackets 32 is positioned adjacent to the first end 22 and the second end 24. The second sections 36 are coupled to a bottom side 38 of the vehicle 12 such that the housing 20 is coextensive with a bottom edge 40 of one of the doors 14.

A pillow 42 is provided. The pillow 42 has a forward side 44, a rear side 46 and a peripheral edge 48 extending therebetween to define an inflation space 50 between the forward side 44 and the rear side 46. The peripheral edge 48 has a top side 52. The pillow 42 is rollably coupled to the spindle 31.

The pillow 42 is positionable in a deployed position having the top side 52 being positioned below a window 54 of one of the doors 14. The pillow 42 is positionable in a stored position having the pillow 42 being contained within the housing 20. A retainer 56 is provided. The retainer 56 has a first end 87 and a second end 60.

The retainer 56 is coupled to the rear side 46 of the pillow 42. The retainer 56 is coextensive with the top side 52. The retainer 56 engages one of the doors 14 when the pillow 42 is positioned in the deployed position. Thus, the pillow 42 covers the door 14. The retainer 56 is magnetic.

A pump 58 is coupled to the vehicle 12. The pump 58 is in fluid communication with the first shield apparatus 16 and the second shield apparatus 18. The pump 58 selectively inflates the pillows 42 when the pillows 42 are positioned in the deployed position. The pump 58 selectively deflates the pillows 42 to facilitate the pillows 42 being positioned in the stored position.

The pump 58 is positioned on the bottom side 38 of the vehicle 12. The pump 58 is electrically coupled to an electrical system 59 of the vehicle 12. The pump 58 may be an air pump of any conventional design. A pair of conduits 62 extends between the pump 58 and each of the pillows 42. The conduits 62 route pumped air into each of the pillows 42.

A control 64 is provided. The control 64 comprises a base control circuit 66 electrically coupled to the pump 58. A base transceiver 68 is electrically coupled to the pump 58. The base transceiver 68 is electrically coupled to the base control circuit 66. The base transceiver 68 may be an RF transceiver of any conventional design.

A remote control 70 is provided for actuating and de-actuating the pump 58. The remote control 70 comprises a remote control circuit 72 electrically coupled to the remote control 70. A remote transceiver 74 is electrically coupled to the remote control 70. The remote transceiver 74 is electrically coupled to the remote control circuit 72. Additionally, the remote transceiver 74 is in electromagnetic communication with the base transceiver 68. The remote transceiver 74 may be an RF transceiver of any conventional design.

A pair of actuators 76 is positioned on the remote control 70. Each of the actuators 76 is electrically coupled to the remote control circuit 72. The actuators 76 include an inflate actuator 78 and a deflate actuator 80. The remote transceiver 74 issues an inflate command and a deflate command to the base transceiver 68 when the actuators 76 are engaged. The remote control 70 may be positioned within the vehicle 12. Additionally, the remote control 70 may be carried.

A remote power supply 82 is positioned within the remote control 70. The remote power supply 82 is electrically coupled to the remote control circuit 72. The remote power supply 82 comprises at least one battery 84.

In use, one or both of the pillows 42 are positioned in the deployed position when the vehicle 12 is parked. The inflate actuator 78 is engaged. The inflated pillows 42 prevent the doors 14 from being damaged while the vehicle 12 is parked. The deflate actuator 80 is actuated when the vehicle 12 is to be driven. The deflated pillows 42 are positioned in the stored position, allowing the vehicle 12 to be driven.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cushioning assembly configured to protect a vehicle door from impact damage, said assembly comprising:
   a vehicle having at least two doors;
   a first shield apparatus and a second shield apparatus each coupled to said vehicle, said first shield apparatus and said second shield apparatus being positionable to cover said doors, said first shield apparatus and said second shield apparatus being configured to shield said doors from impact damage;
   a pump coupled to said vehicle, said pump being in fluid communication with said first shield apparatus and said second shield apparatus, said pump selectively inflating and deflating said first shield apparatus and said second shield apparatus; and
   a control for selectively actuating and de-actuating said pump;
   wherein each of said first shield apparatus and said second shield apparatus comprising a housing having a first end, a second end and a perimeter wall extending therebetween, said perimeter wall having a front side and a back side, said front side being hingedly coupled to said perimeter wall to access an interior of said housing, said housing being coupled to said vehicle;
   a pillow having a forward side, a rear side and a peripheral edge extending therebetween to define an inflation space between said forward side and said rear side, said peripheral edge having a top side, said pillow being removably positioned within said housing, said pillow being positionable in a deployed position having said top side being positioned below a window of one of said doors, said pillow being positionable in a stored position having said pillow being contained within said housing; and
   a retainer having a first end and a second end, said retainer being coupled to said rear side, said retainer being coextensive with said top side.

2. The assembly according to claim 1, wherein said retainer engaging one of said doors when said pillow is positioned in said deployed position such that said pillow is retained to cover said door, said retainer being magnetic.

3. The assembly according to claim 1, wherein said pump selectively inflating said pillows when said pillows are positioned in said deployed position, said pump selectively deflating said pillows to facilitate said pillows being positioned in said stored position, said pump being positioned on a bottom side of said vehicle, said pump being electrically coupled to an electrical system of said vehicle.

4. The assembly according to claim 1, wherein said control comprising a base control circuit electrically coupled to said pump.

5. The assembly according to claim 4, further comprising a base transceiver electrically coupled to said pump, said base transceiver being electrically coupled to said base control circuit.

6. The assembly according to claim 5, wherein a remote control for actuating and de-actuating said pump, said remote control comprising a remote control circuit electrically coupled to said remote control.

7. The assembly according to claim 6, wherein a remote transceiver electrically coupled to said remote control, said remote transceiver being electrically coupled to said remote control circuit, said remote transceiver being in electromagnetic communication with said base transceiver.

8. The assembly according to claim 7, wherein a pair of actuators positioned on said remote control, each of said actuators being electrically coupled to said remote control circuit such that said remote transceiver issues an inflate command and a deflate command to said base transceiver when said actuators are engaged.

9. The assembly according to claim 8, wherein a remote power supply positioned within said remote control, said remote power supply being electrically coupled to said remote control circuit, said remote power supply comprising at least one battery.

10. A cushioning assembly configured to protect a vehicle door from impact damage, said assembly comprising:
    a vehicle having at least two doors;
    a first shield apparatus and a second shield apparatus each coupled to said vehicle, said first shield apparatus and said second shield apparatus being positionable to cover said doors, said first shield apparatus and said second shield apparatus being configured to shield said doors from impact damage, each of said first shield apparatus and said second shield apparatus comprising:
- a housing having a first end, a second end and a perimeter wall extending therebetween, said perimeter wall having a front side and a back side, said front side being hingedly coupled to said perimeter wall to access an interior of said housing, said housing being coupled to said vehicle;
- a pillow having a forward side, a rear side and a peripheral edge extending therebetween to define an inflation space between said forward side and said rear side, said peripheral edge having a top side, said pillow being removably positioned within said housing, said pillow being positionable in a deployed position having said top side being positioned below a window of one of said doors, said pillow being positionable in a stored position having said pillow being contained within said housing; and
- a retainer having a first end and a second end, said retainer being coupled to said rear side, said retainer being coextensive with said top side, said retainer engaging one of said doors when said pillow is positioned in said deployed position such that said pillow is retained to cover said door, said retainer being magnetic;

a pump coupled to said vehicle, said pump being in fluid communication with said first shield apparatus and said second shield apparatus, said pump selectively inflating said pillows when said pillows are positioned in said deployed position, said pump selectively deflating said pillows to facilitate said pillows being positioned in said stored position, said pump being positioned on a bottom side of said vehicle, said pump being electrically coupled to an electrical system of said vehicle;

a control, said control comprising:
- a base control circuit electrically coupled to said pump;
- a base transceiver electrically coupled to said pump, said base transceiver being electrically coupled to said base control circuit; and
- a remote control for actuating and de-actuating said pump, said remote control comprising:
  - a remote control circuit electrically coupled to said remote control;
  - a remote transceiver electrically coupled to said remote control, said remote transceiver being electrically coupled to said remote control circuit, said remote transceiver being in electromagnetic communication with said base transceiver;
  - a pair of actuators positioned on said remote control, each of said actuators being electrically coupled to said remote control circuit such that said remote transceiver issues an inflate command and a deflate command to said base transceiver when said actuators are engaged; and
  - a remote power supply positioned within said remote control, said remote power supply being electrically coupled to said remote control circuit, said remote power supply comprising at least one battery.

* * * * *